March 15, 1938.     H. F. CROTTY     2,111,419
CABLE CONNECTER
Filed Jan. 17, 1936
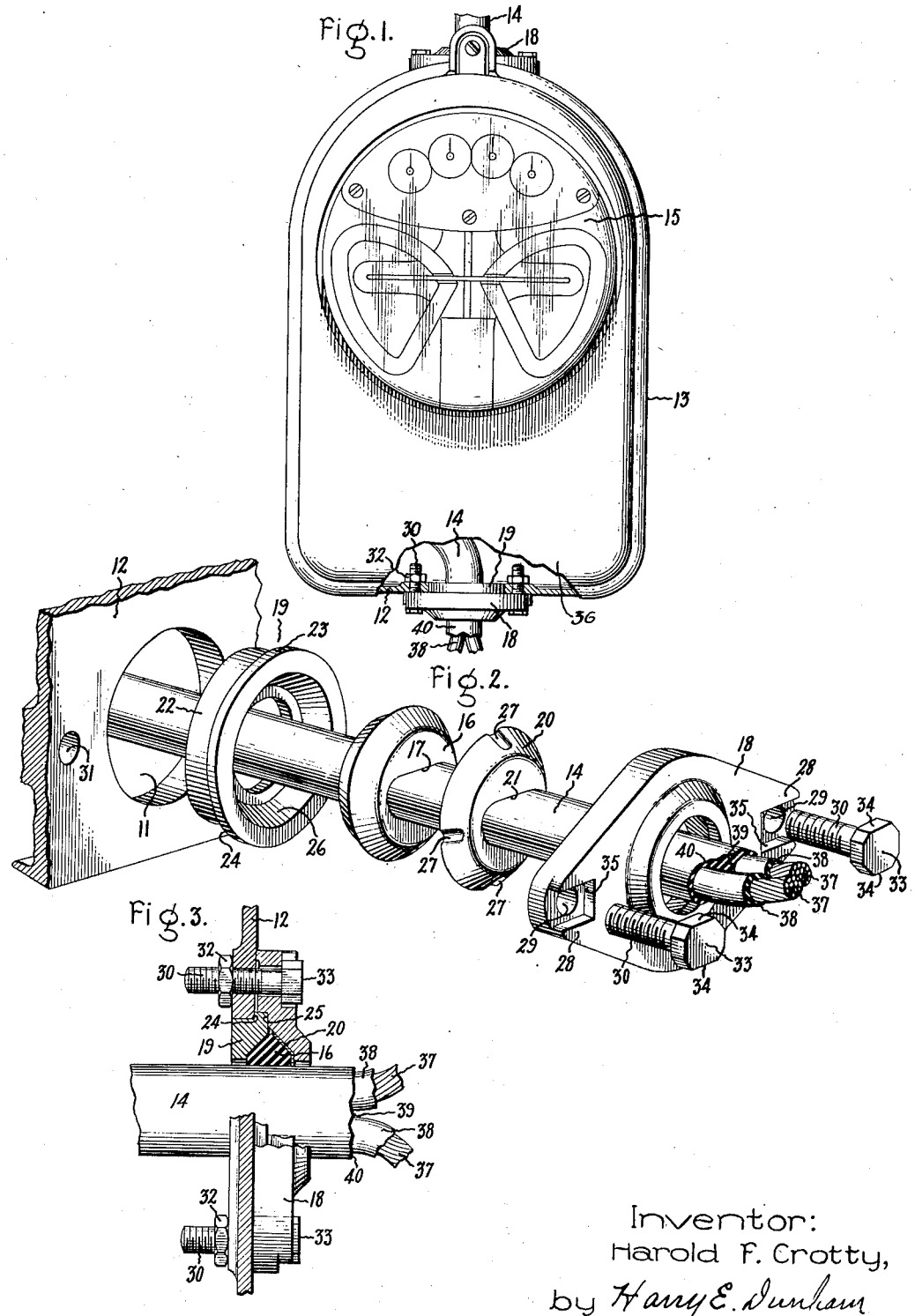
Inventor:
Harold F. Crotty,
by Harry E. Dunham
His Attorney.

Patented Mar. 15, 1938

2,111,419

UNITED STATES PATENT OFFICE 2,111,419

CABLE CONNECTER

Harold F. Crotty, Boston, Mass., assignor to General Electric Company, a corporation of New York Application January 17, 1936, Serial No. 59,581

3 Claims. (Cl. 285—46)

My invention relates to protective casings for electrical devices and concerns particularly arrangements for bringing electric cables into meter-protective casings and providing a sealed mechanical connection between the cable and the casing.

It is an object of my invention to provide a joint between an electric cable and an electrical-device casing which is both tamperproof and weathertight, preventing the damaging of apparatus in the casing or interference with it either by the elements or by unauthorized persons.

It is a further object of my invention to provide such a sealing and connecting arrangement which shall be both relatively inexpensive and easily installed.

It is still another object of the invention to provide apparatus which shall be removable and replaceable to permit the use of different sizes or types of cable.

Other and further objects and advantages will become apparent as the description proceeds.

In carrying out my invention in its preferred form, I utilize a casing having circular openings of predetermined uniform size for receiving electric cable and I provide removable nipples and washers fitting the openings in the casing and adapted to compress gaskets of resilient material around the cable where it enters the wall of the casing.

The invention will be understood more readily from the following detailed description when considered in connection with the accompanying drawing, and those features of the invention which are believed to be novel and patentable will be pointed out in the claims appended hereto. In the drawing, Fig. 1 is a front elevation of a meter casing employing cable connections embodying my invention; Fig. 2 is an exploded view of the cable connections in Fig. 1 showing only a fragment of the wall of the meter casing; and Fig. 3 is a top view partially in cross section of the apparatus of Fig. 2.

Like reference characters are utilized in the drawing to designate like parts throughout. The drawing illustrates the application of my invention to a meter casing although the invention may be employed for sealing cable entrances in any type of casing, including protective casings for instruments, relays, switches, and other electrical devices.

Preferably, I provide circular openings 11 of a predetermined uniform size in the walls 12 of a casing, such as a meter casing 13, intended to receive electric cable 14 for making electrical connections to an electric meter 15 within the casing 13. A resilient gasket or bushing 16 is provided, having an opening 17 adapted to conform substantially in shape to the cable 14 which is being used. The gasket 16 is fitted against a removable nipple 18, which is adapted to cover the opening 11 in the casing wall 12. Preferably, a cupped and shouldered washer 19 is provided in order to have a removable member against which the resilient gasket 16 may be pressed by the nipple 18. In order to provide better protection for the resilient gasket 16 and to prevent unauthorized persons from gaining access to the meters of the casing 13 by forcing an instrument in between the cable 14 and the gasket 16 or by breaking out a portion of the gasket 16, a concave metal bushing 20 may be provided conforming in shape to the gasket 16 and the inner surface of the nipple 18 and having an opening 21 quite closely fitting the cable 14.

The washer 19 is so arranged as to make a close fitting joint with the casing wall 12 and is so arranged as not to be pushed through the opening 11 when the nipple 18 is clamped against the wall 12. For example, a ground and beveled joint may be provided, or both the opening 11 and the portion 22 of the washer 19 may be cylindrical and the washer 19 may be provided with a rim 23 to form a shoulder 24 abutting against the edge of the opening 11. The nipple 18 may be recessed at 25 to fit the rim 23 in the cupped washer 19. If desired, the washer 19 or the nipple 18 may be rabbeted and a ridge may be provided on the edge of the opening 11 as described in the copending application of Thomas A. Abbott, filed January 17, 1936, Serial No. 59,594, and assigned to the same assignee as the present application. The cupped portion 26 of the washer 19 opens in a direction opposite to the direction in which the shoulder 24 abuts against the casing wall 12 in order that clamping the nipple 18 against the wall 12 will simultaneously compress the gasket 16 against and into the washer 19 and hold the washer 19 against the wall 12.

The gasket 16 is preferably so shaped as to conform substantially to the shapes of the cupped washer 19 and of the metal bushing 20 or of the inner surface of the nipple 18; but the gasket 16 is of such thickness that clamping the nipple 18 against the casing wall 12 tends to compress the material of the gasket 16 and force it tightly against the cable 14 so as to grip the cable 14 tightly and make a tight joint as well as making a tight joint with the washer 19. While any suitable resilient and durable material may be employed for the gasket 16, I have found rubber or a rubber composition to be satisfactory. If desired, the metal bushing 20 may have stiffening grooves 27 pressed into it.

Any suitable means may be provided for fastening or clamping the nipple 18 to the casing wall 12 over the opening 11. For example, the nipple 18 may be so shaped as to provide wings 28 containing bolt holes 29 for bolts 30 adapted to enter bolt holes 31 in the casing wall 12. Preferably, the bolt holes 31 are not threaded but receive the bolts 30 loosely, and nuts 32 are provided permitting the assembly to be tightened from the inside.

The bolts 30 have their heads 33 non-cylindrical, being flattened at the sides 34, and portions of the wings 28 adjacent the bolt heads 33 are sunk to form straight sided recesses 35 receiving the bolt heads 33 and preventing them from turning. When the bolts 30 are drawn tight by tightening the nuts 32 from the inside of the casing 13, neither the nipples 18 nor the cable 14 can be removed without opening the casing 13 to loosen the nuts 32. It will be understood that casings such as that shown at 13 are ordinarily provided with sealing and locking means, not shown, so that the cover 36 cannot be removed by unauthorized persons, or, at least, cannot be removed without destroying some part of the apparatus, disclosing to inspectors or meter readers that the apparatus has been tampered with.

In the drawing, nipples 18 are shown connected to the meter casing 13 at the top and bottom, but it will be understood that any number of nipples may be used and may be attached to sides or back as well as to the top and bottom of the casing. Different sizes or shapes of cable may be accommodated merely by replacing the relatively inexpensive bushings 16 and 20 with others having suitably shaped openings therein. Even very great differences in size of cable to be attached may be taken care of by providing nipples 18 and washers 19 with different internal diameters, permitting the power companies to limit their stocks of casings 13, the most expensive part, to only one style. In cases where cable of only one size and shape is ever to be accommodated, the washer 19 may be made integral with the casing wall 12 and the metal bushing 20 may be made integral with the nipple 18; that is, the washer 19 and the bushing 20 may be eliminated by correspondingly shaping the openings in the wall 12 and the nipple 18.

The cable 14, it will be understood, comprises one or more conductors 37 surrounded by individual insulation 38. Preferably, additional insulation 39 surrounding all the conductors 37 is provided. The insulation 39 is then wrapped or encased in one or more layers 40 of very tough wear and force resistant material if desired, with a wrapping of metallic wires interposed. The cable 14 is therefore, sufficiently protected to serve the same purpose as a conduit. The conductors 37 are electrically connected to terminals of the meter 15 inside the casing 13 in a manner which constitutes no part of my invention.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A cable bushing arrangement for an electrical-device casing having a wall with a cable-receiving opening therein, said arrangement comprising, in combination with the wall of a casing, a cupped washer with a shoulder abutting in a given direction against the edges of said opening in said casing wall and with a cupped portion opening in the opposite direction, a resilient gasket fitting against said washer in said cupped portion and having an opening therein in which a cable is adapted to fit, a relatively rigid bushing pressed from sheet metal with a concave face fitting against said gasket and having an opening therein substantially conforming to the surface of said cable, a nipple against said metal bushing, and means for clamping said nipple against said casing wall, thus compressing said gasket between said cupped washer and said metal bushing and making a tight joint between said gasket and said cable.

2. A cable bushing arrangement for an electrical device casing having a wall with a cupped cable receiving opening therein, said arrangement comprising, in combination with such a wall of a casing, a resilient gasket fitting against the cupped portion of said wall and having an opening therein in which a cable is adapted to fit, a relatively rigid bushing pressed from sheet metal with a concave surface fitting against said gasket and having an opening therein substantially conforming to the surface of said cable, a nipple against said metal bushing, and means for clamping said nipple against said casing wall, thus compressing said gasket between said cupped wall and said metal bushing and making a tight joint between said gasket and said cable.

3. A cable bushing arrangement for a non-circular electric cable and an electrical device casing having a wall with a cupped cable receiving opening therein, said arrangement comprising in combination with such a cupped wall of a casing a resilient gasket fitting against said wall in said cupped portion and having an opening therein in which the cable is adapted to fit, a relatively rigid bushing pressed from sheet metal with a concave surface fitting against said gasket and having an opening therein substantially conforming to the surface of said cable, and means for clamping said bushing against said casing wall, thus compressing said gasket between said cupped wall and said metal bushing and making a tight joint between said gasket and said cable.

HAROLD F. CROTTY.